Sept. 6, 1966 J. W. AUSTIN 3,270,457
FISHING ROD AND ATTACHMENT THEREFOR
Filed Sept. 24, 1964
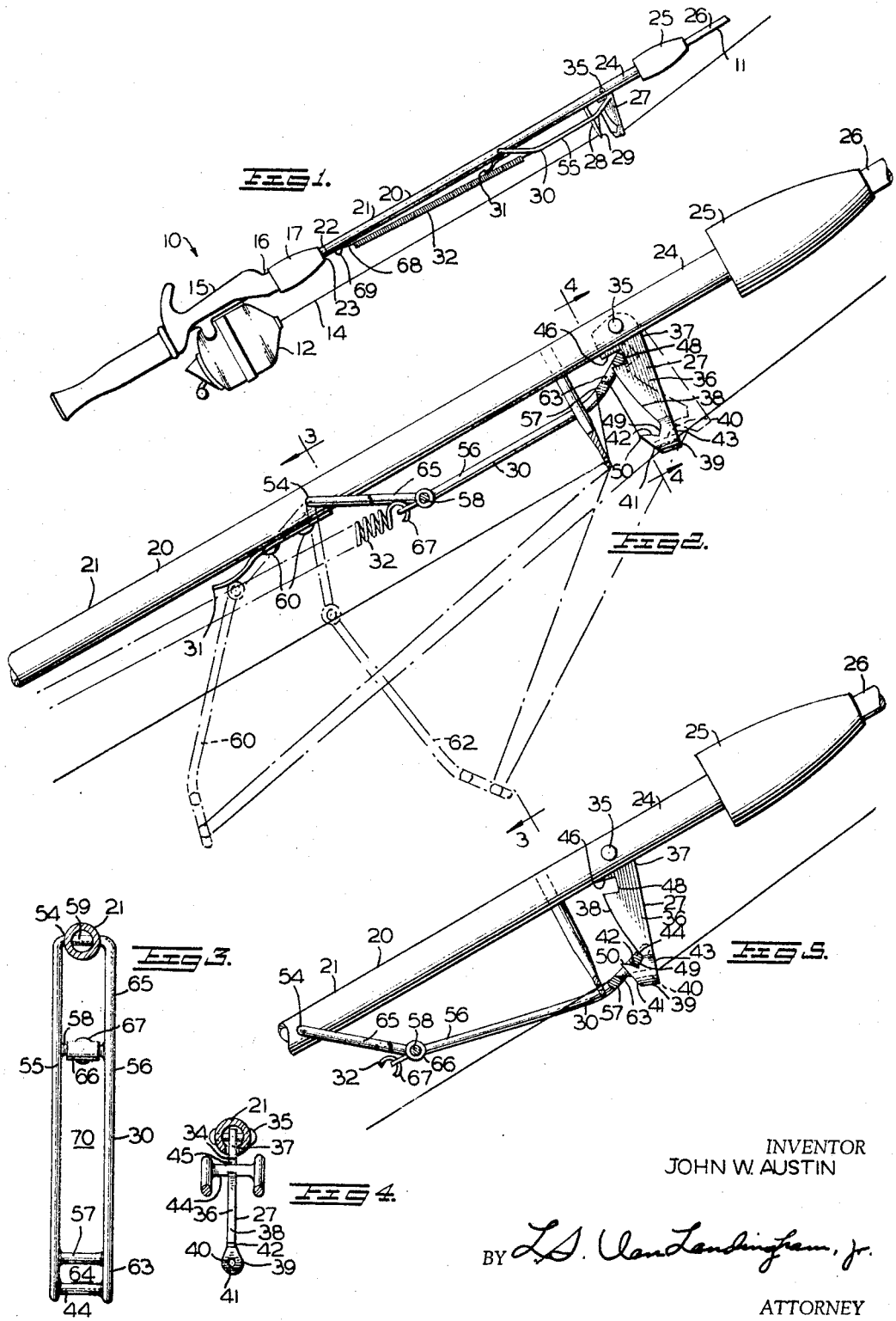
INVENTOR
JOHN W. AUSTIN
BY L.S. Van Landingham, Jr.
ATTORNEY United States Patent Office 3,270,457
Patented Sept. 6, 1966

3,270,457
FISHING ROD AND ATTACHMENT THEREFOR
John Wells Austin, Rte. 1, Moselle, Miss.
Filed Sept. 24, 1964, Ser. No. 398,964
11 Claims. (Cl. 43—15)

This invention broadly relates to fishing tackle and, in one of its more specific variants, to an improved fishing rod or rod and reel which is capable of automatically setting a fishing hook in the fish's mouth. The invention further relates to an attachment for adapting prior art fishing rods or rods and reels to thereby provide improved fishing rods or rods and reels in accordance with the invention.

A number of hook-setting devices have been proposed heretofore for the general purpose of hooking a fish or setting the hook in the fish's mouth. However, these prior art devices have inherent disadvantages and shortcomings and thus have not proved entirely satisfactory in all respects. For example, among other disadvantages, the prior art devices have been unreliable in operation, difficult or inconvenient to operate properly in the field, too insensitive to be triggered by small fish or, when finally triggered, the hooking action often does not occur at the proper time and the fish escapes. The prior art devices also have been constructed of a large number of complicated or relatively delicate parts and therefore are expensive to manufacture and keep in good repair and working order. Additionally, the prior art devices have not been ruggedly constructed of simple, inherently strong parts, and designed so that they may be used as an integral part or extension of the fishing rod and therefore completely out of the way of the fisherman.

It is an object of the present invention to provide an improved fishing rod or rod and reel for automatically setting a fishing hook in the fish's mouth which overcomes one or more of the above mentioned and other disadvantages of the prior art.

It is a further object to provide an attachment for prior art fishing rods or rods and reels whereby they may be converted into the improved fishing rod or rod and reel of the invention which is mentioned above.

Still other objects and advantages of the invention will be apparent to those skilled in the art upon reference to the following detailed description and the illustrative drawings, wherein:

FIGURE 1 is a side elevational view of a fish hook-setting attachment for a fishing rod which is constructed in accordance with the present invention, the attachment being shown mounted on and in combination with a prior art fishing rod and reel, with portions of the fishing rod being broken away in the interest of simplifying the drawings;

FIGURE 2 is an enlarged side elevational view of the improved rod and reel of the invention and the fish hook setting attachment therefor which are illustrated in FIGURE 1, portions of which are broken away, and with the solid lines indicating the usual positions of the trigger, hook setting arm and fishing line during fishing and before triggering of the fish hook setting device, and with the dashed lines indicating their respective positions after triggering or during playing of the fish;

FIGURE 3 is a cross sectional view taken along the line 3—3 of FIGURE 2, and with the fish hook setting arm being in the intermediate position which is illustrated in FIGURE 2 by dashed lines;

FIGURE 4 is a cross sectional view taken along the line 4—4 of FIGURE 2; and

FIGURE 5 is an enlarged side elevational view similar to FIGURE 2, of the improved rod and reel of the invention and the fish hook setting attachment therefor which are illustrated in FIGURE 1, portions of which are broken away, and with the view indicating the usual positions of the trigger, hook setting arm and fishing line during casting of the lure or bait, or when it is not desired to use the automatic hook setting device.

Referring now to the drawings, the prior art rod and reel generally designated as 10 includes a rod 11, a reel 12, and a fishing line 14. The reel 12 is mounted on the reel mounting portion 15, which is provided on its outer end 16 with a chuck 17.

The rod and reel 10 are also provided with an automatic fish catching or fish hook setting attachment 20. The attachment 20 includes a shaft 21 which is preferably of tubular construction such as aluminum tubing, the inner end 22 of which is received by chuck 17 and is securely retained thereby. The inner end 22 may have a diameter not greater than that of the smallest fishing rods for spinning reels now in common use. When so constructed and when the chuck 17 of the reel to be adapted is too large to retain the end 22 securely, the end 22 is provided with a bushing 23. The bushing 23 has an outside diameter which is small enough to insert into chuck 17 when it is in the opened or loosened position, and which is large enough to enable end 22 to be securely held upon tightening the chuck 17. The bushing 23 is preferably constructed of a somewhat flexible or pliable material such as plastic or relatively hard rubber. If desired, the attachment 20 may be sold to the purchaser together with a series of bushings 23 which may have varying outside diameters that allow the proper size to be selected for use with the purchaser's prior art rod and reel.

The outer end 24 of shaft 21 is provided with a chuck 25 which reecives and securely holds the inner end 26 of fishing rod 11. The chuck 25 is preferably designed so as to be capable upon proper adjustment of receiving and retaining the various types of prior art fishing rods in common use, and thus should be capable of adjustment to accommodate a wide range of fishing rod diameters.

The attachment 20 is also provided with, in the order of increasing distance from the outer end 24 of shaft 21, a trigger 27, a stationary post 28 provided on its outer end with an opening or eye 29 for fishing line 14, a hook-setting arm 30, stop 31 for hook-setting arm 30 and helical spring 32. The trigger 27 is mounted in the longitudinally extending slot 34 in shaft 21 by means of pin 35 so as to be free to move in a plane passing through and extending longitudinally with respect to the shaft 21, as shown by the solid lines in FIGURES 2 and 5 and the dashed lines in FIGURE 2. As best seen in FIGURE 4, the main body portion 36 of trigger 27 is preferably relatively thin and flat. The mounting end 37 is relatively broad and the inner edge 38 is tapered to provide increasingly narrow widths for the main body portion 36 as the trigger 27 extends from shaft 21. The trigger 27 terminates in an enlarged portion 39 which is provided with an opening or eye 40 for receiving fishing line 14 and which has an inner surface 41 that is tapered to an increasing width as it extends toward the shaft 21. A slot 42 is provided in the end 43 of trigger 27 for receiving and retaining the cross member 44 of hook-seating arm 30 when it is in the normal casting position illustrated in FIGURE 5. The tapered surface 38 is also provided with a slot 45 for receiving and retaining the cross member 44 when it is in the normal fishing position illustrated in solid lines in FIGURE 2.

It may be noted that the slot 45 has an upper shoulder 46 which extends outward past the lower shoulder 47, and also that the slot 45 is tapered somewhat as it extends inward whereby the back 48 thereof is wider than the front. The slot 42 is also tapered as it extends inward, but the taper is such that the back 49 is narrower than the front. Also, a shoulder 50 is provided which extends outward a substantial distance. The tapers of the slots 42 and 47 and the surface 38, and the extended positions of shoulders 46 and 50, are such that they cooperate in seating and retaining the cross member 44 when the arm 30 and the trigger 27 are in the positions shown by the solid lines in FIGURES 2 and 5, and yet allow instantaneous release of the arm 30 to allow it to rapidly take the position shown by the dashed lines in FIGURE 2 when the trigger is moved to the position shown by the dashed lines.

The arm 30 will be referred to as having a generally U-shaped configuration when observed in elevation, as best seen in FIGURES 1, 2 and 5. As best seen in FIGURE 3, the arm 30 includes a pair of elongated cylindrical spaced members 55 and 56 which are joined together and reinforced by cylindrical cross members 45, 57, 58 and 59. The cross member 59 extends through an opening 54 in shaft 21, to thereby provide a mounting for the arm 30 and allow it to pivot in a plane passing through and extending longitudinally with respect to shaft 21. For example, as best seen in FIGURE 2, the arm 30 is free to pivot between the position shown by the solid lines and the position 60 shown by the dashed lines, or between points intermediate these positions.

The stop 31 which is attached to shaft 21 by means of rivet 61 prevents further inner-movement of arm 30. This assures the presence of a relatively large angle between the arm 30 and shaft 21, and thus a relatively light tug outward on the fishing line 14 will move the arm 30 from the position 60 to the intermediate position 62, and thereby allow the fish to be played. Otherwise, the arm 30 would be free to move directly against the shaft 21, and the angle between the shaft 21 and arm 30 would be so small that an extremely hard pull outward on line 14 would be necessary in order for the arm 30 to be moved to the intermediate position 62. This would tend to break the fishing line or strip the hook from the fish's mouth.

The cross members 44 and 57 are located near the outer end or leg 63 of arm 30 and spaced relatively close together to form an opening or eye 64 for fishing line 14. The cross member 58 is located at a point spaced from the shaft 21, and preferably where the inner leg 65 joins the body of arm 30. A second opening or eye 70 in arm 30 is provided for fishing line 14 between cross members 57 and 58. Also, as best seen in FIGURES 2 and 5, the post 28 is positioned to extend downward into opening 70.

A rotatable mounting 66 is carried by cross member 58, and the outer end 67 of helical spring 32 is attached thereto. The inner end 68 of spring 32 is attached to the inner end 22 of shaft 21 by means of rivet 69. The spring 32 is mounted so as to be under tension at all times, and therefore tends to return and retain the arm 30 in the position 60.

In operating the improved rod and reel of the invention, the arm 30 is placed in the position 60 and the fishing line 14 is pulled from reel 12 and threaded, successively, through the opening 70 in arms 30, the eye 29 in post 28, the opening 64 in arm 30, and the eye 40 in enlarged end 39 of trigger 27, and then through the usual eyes located on prior art fishing rods 11. Thereafter, the usual hooks and lead weights are attached to the fishing line as in conventional practice.

Once the fishing rod and reel have been properly threaded and prepared for fishing, the arm 30 is moved from the position 60 to the position shown in solid lines in FIGURE 5. When the arm 30 is in this position, then the fishing line is retained in a substantially straight position and there is no drag thereon during casting. Also, a tug outward on the line 14 has no effect on trigger 27 insofar as movement is concerned. Therefore, the cross member 44 remains in slot 42, and is retained thereby regardless of whether or not there is a tug outward on line 14.

The lure or bait is then cast outward following conventional practice and thereafter the arm 30 is pushed upward toward shaft 21 to the position shown in solid lines in FIGURE 2. As the arm 30 moves upward, it engages the tapered surface 38 and the end 43 of the trigger 27 is moved toward the outer end 24 of shaft 21, until the cross member 44 strikes the projecting upper shoulder 46 of slot 45. When this occurs, the trigger 27 is caused to reverse its direction of movement around mounting pin 35, and the end 43 of trigger 27 is caused to move in a direction toward the inner end 22 of shaft 21. Thus, the trigger moves to the position shown by the solid lines in FIGURE 2, and the cross member 44 is securely seated in slot 45 and retained thereby.

It may be noted that when the arm 30 is moved from the position shown in FIGURE 5 to the position shown by the solid lines in FIGURE 2, the fishing line 14 is carried upward and is positioned over cross member 57. When in this position, the line 14 may be reeled in following the usual prior art practice and pulling in on the line has no effect on the position of the trigger; however, a slight tug outward on the line 14 when the fish takes the bait or lure causes the enlarged end 39 of trigger 27 to move outward to the position shown by the dotted lines in FIGURE 2. The cross member 44 then falls from slot 45 and the arm 30 is quickly and energetically pulled by means of tensioned spring 32 to the position 60 shown by the dotted lines in FIGURE 2. Since the fishing line 14 is threaded through the opening 64 in arm 30, it wraps around cross member 44 as arm 30 moves to position 60 and a double section of fishing line 14 is pulled toward the inner end 22 of shaft 21. This results in a quick jerk inward on fishing line 14 and causes the fishing line to move inward a substantial distance and thereby sets the hook in the fish's mouth.

Once the fish hook is set in the fish's mouth by operation of the hook-setting device as described above, it is then possible to play the fish. Since the arm 30 is urged by spring 32 into position 60, a substantial tug outward on the fishing line 14 will move the arm 30 to the position 62 shown by the dashed lines in FIGURE 2, or even to a more advanced position provided the tug is sufficiently strong. During the tug outward on the line, the arm 30 is moved outward against the urging of spring 32 and line 14 is maintained under tension. Thus, when the fish tires temporarily the line is pulled inward and the arm 30 is returned to the position 60. This may be repeated until the fish is exhausted and is ready to be reeled in. It may be noted that in all instances the line is maintained under tension, and thus the fish is not free to throw the hook and escape.

In instances where it is not desired to operate the automatic hook-catching device, then the arm 30 is kept in the position illustrated in FIGURE 5. When the arm 30 is in this position, the fish may be hooked following prior art practice and it is not necessary to remove the attachment 20.

The attachment 20 may be manufactured as a separate component and used for converting conventional prior art rods or rods and reels, and especially spinning reels. However, it also may be incorporated with the rod or rod and reel at the time of manufacture. In such instances, it is possible to eliminate chuck 25 and the shaft 21 then becomes an integral extension or portion of rod 11.

The foregoing detailed discussion and the various views in the drawings are for purposes of illustration only, and are not intended as being limiting to the spirit or scope of the appended claims.

What is claimed is:

1. An attachment for a fishing rod comprising a support member, a trigger means, the trigger means being mounted on the support means and movable between first and second positions, the trigger means extending away from the support member and including means located at a point remote from the support member for receiving a first portion of a fishing line, an arm means, the arm means being mounted on the support means at a point remote from the trigger means, the arm means extending away from the support means and including a portion remote from the support member which is movable between first and second positions, resilient means, the resilient means urging the arm from the first position toward the second position, the trigger means including means for retaining the arm means in the first position when the trigger means is in the first position, means operative when the trigger means is in the first position for retaining a second portion of the fishing line a substantially different distance from the support means than the first portion, means for receiving a third portion of the fishing line mounted on the support means between the points of mounting for the arm means and the trigger means, the means for receiving the third portion of fishing line being substantially in alignment with the means on the trigger for receiving the first portion of fishing line, the means for retaining the second portion of the fishing line being carried by the arm means and located between the means for receiving the third portion of fishing line and the trigger means when the arm means is in the first position, the trigger means being movable from the first position to the second position upon movement of the first portion of the fishing line therefrom in a direction away from the second portion, the means for retaining the arm means being rendered ineffective to retain the arm in the first position when the trigger means is moved from the first position to the second position whereby the arm means is released and is urged to the second position by the resilient means, and the arm means including means for pulling on the fishing line when the portion of the arm means is moved from the first position to the second position.

2. The attachment of claim 1 wherein stop means is carried by the support means for preventing the resilient means from urging the portion of the arm means past the second position.

3. The attachment of claim 1 wherein the support means includes a shaft and adjustable fastening means is provided on the end of the shaft nearest the trigger means for attaching the shaft to a fishing rod in axial alignment therewith.

4. The attachment of claim 1 wherein the trigger means includes means for holding substantially in alignment the said means for receiving the first, second and third portions of the fishing line.

5. The attachment of claim 4 wherein the support means includes a shaft, adjustable fastening means is provided on the end of the shaft nearest the trigger means for attaching the shaft to a fishing rod in axial alignment therewith, and stop means is provided on the shaft for preventing the resilient means from urging the said portion of the arm means past the second position.

6. An attachment for a fishing rod comprising a shaft having an outer end and an inner end, an elongated trigger, one end of the trigger being pivotally mounted on the shaft whereby the other end is movable between first and second positions in a plane extending substantially longitudinally with respect to the shaft, the trigger having an opening therein at a point remote from the shaft for loosely receiving a fishing line, the trigger also having a slot formed therein between the opening therein and the shaft, the slot facing toward the inner end of the shaft when the trigger is in the first position, the outer end of the trigger being moved toward the outer end of the shaft when the trigger is moved from the first position to the second position whereby the shoulder of the slot nearest the outer end of the trigger is moved toward the outer end of the shaft, an elongated arm, one end of the arm being pivotally mounted on the shaft whereby the other end is movable between first and second positions in a plane extending substantially longitudinally with respect to the shaft, the arm being mounted at a point remote from the trigger and toward the inner end of the shaft therefrom, the outer end of the arm being nearer the outer end of the shaft when in the first position than in the second position, a spring, the spring urging the arm from the first position toward the second position, the arm having a transverse member near the outer end, the transverse member being seated in the slot of the trigger when the arm is in the first position whereby the arm is retained thereby, the arm also having an opening formed therein for loosely receiving a fishing line, the opening being substantially nearer the shaft than the opening in the trigger when the arm is in the first position whereby the openings are out of alignment and portions of a fishing line threaded therethrough are retained at substantially different distances from the shaft, the trigger being moved from the first position to the second position upon pulling the fishing line from the opening in the trigger and in a direction toward the outer end of the shaft, the transverse member of the arm being released from the slot when the trigger is moved from the first position to the second position and the arm being urged into the second position by the spring, and the opening in the arm being located a substantially greater distance from the point of mounting of the arm than the opening in the trigger is located from the point of mounting of the trigger whereby the fishing line is pulled toward the inner end of the shaft as the arm moves from the first position to the second position.

7. The attachment of claim 6 wherein the trigger has a second slot located between the first slot and the said opening therein, the second slot facing toward the inner end of the shaft, the trigger and arm being movable to a third position and the transverse member of the arm being seated in the second slot when the trigger and arm are in the third position, the openings in the arm and trigger being substantially in alignment when the arm and trigger are in the third position whereby a pull on the fishing line toward the outer end of the shaft does not cause the trigger to move to the second position.

8. The attachment of claim 7 wherein a post is mounted on the shaft between the trigger and the arm, the post having an opening therein for loosely receiving the fishing line which is substantially in alignment with the opening in the arm and trigger when in the third position thereof, and the said portion of the arm having the opening formed therein being positioned between the post and the trigger when the arm and trigger are in the first and third positions thereof whereby the fishing line may be threaded successively through the openings in the post, arm and trigger.

9. The attachment of claim 8 wherein a stop is mounted on the shaft to prevent the arm when in the second position from being urged against the shaft by the spring means, and the outer end of the shaft is provided with a chuck for fastening the shaft to a fishing rod in axial alignment therewith.

10. An improved fishing rod comprising a fishing rod having inner and outer ends, a trigger means mounted on the fishing rod so as to be movable between first and second positions, the trigger means extending outward from the fishing rod and including means located at a point remote therefrom for receiving a first portion of a fishing line, an arm means, the arm means being mounted on the fishing rod at a point remote from the trigger means, the arm means extending away from the fishing rod and including a portion remote therefrom which is movable between first and second positions, resilient means, the resilient means urging the arm means from the first position toward the second position, the trigger means including means for retaining the arm means in the first position when the trigger means is in the first position, means operative when the trigger means is in the first position for retaining a second portion of the fishing line a substantially different distance from the fishing rod than the first portion, means for receiving a third portion of the fishing line mounted on the fishing rod between the points of mounting for the arm means and the trigger means, the means for receiving the third portion of the fishing line being substantially in alignment with the means on the trigger for receiving the first portion of fishing line, the means for retaining the second portion of the fishing line being carried by the arm means and being located between the means for receiving the third portion of the fishing line and the trigger means when the arm means is in the first position, the trigger means being movable from the first position to the second position upon movement of the first portion of the fishing line in a direction away from the second portion, the means for retaining the arm means being rendered ineffective to retain the arm in the first position when the trigger means is moved from the first position to the second position whereby the arm means is released and is urged to the second position by the resilient means, and the arm means including means for pulling on the fishing line when the said portion of the arm means is moved from the first position to the second position.

11. The improved fishing rod of claim 10 wherein the trigger means includes means for holding the said means for retaining the second portion of the fishing line substantially in alignment with the means for receiving the first and third portions of the fishing line.

References Cited by the Examiner
UNITED STATES PATENTS

| | | | |
|---|---|---|---|
| 2,340,588 | 2/1944 | Groves | 43—15 |
| 2,658,299 | 11/1953 | Maxfield | 43—15 |
| 2,841,912 | 7/1958 | Eining | 43—15 |
| 2,851,811 | 9/1958 | Mantell | 43—15 |
| 3,165,855 | 1/1965 | Stephenson | 43—19 |

SAMUEL KOREN, *Primary Examiner.*

W. H. CAMP, *Assistant Examiner.*